United States Patent
Lan et al.

(10) Patent No.: US 9,852,048 B2
(45) Date of Patent: Dec. 26, 2017

(54) SIMULATING PROCESS VARIABLE CHANGES DURING PROCESS RUNTIME

(71) Applicant: International Business Machines Corporation, Armonk, NY (US)

(72) Inventors: Ling Lan, Austin, TX (US); Xin Peng Liu, Beijing (CN); Shu Chao Wan, Beijing (CN); Liang Wang, Beijing (CN); Yue Wang, Beijing (CN); Jing Jing Wei, Beijing (CN); Yu Zhang, Beijing (CN); Dian Guo Zou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 13 days.

(21) Appl. No.: 14/997,752

(22) Filed: Jan. 18, 2016

(65) Prior Publication Data
US 2017/0206153 A1   Jul. 20, 2017

(51) Int. Cl.
*G06F 17/50*   (2006.01)
*G06F 11/36*   (2006.01)
*G06F 9/44*   (2006.01)

(52) U.S. Cl.
CPC ........ *G06F 11/3664* (2013.01); *G06F 11/362* (2013.01)

(58) Field of Classification Search
CPC ..... A61B 5/00; A61B 5/0205; G06F 17/5022; G06F 17/5009; G06F 11/3636; G06F 11/3664; G06F 11/362; G06F 17/5045
See application file for complete search history.

(56) References Cited

U.S. PATENT DOCUMENTS

| | | | | |
|---|---|---|---|---|
| 6,751,583 | B1 * | 6/2004 | Clarke | G06F 17/5022 703/17 |
| 7,133,820 | B2 * | 11/2006 | Pennello | G06F 11/3636 703/21 |
| 7,607,124 | B2 | 10/2009 | Gooty et al. | |
| 7,970,596 | B2 * | 6/2011 | Bade | G06F 17/5022 703/13 |
| 8,666,723 | B2 * | 3/2014 | Xie | G06F 9/455 703/13 |
| 9,262,299 | B1 * | 2/2016 | Wilmot | G06F 11/3668 |
| 9,459,992 | B2 * | 10/2016 | Spycher | G06F 11/3664 |

(Continued)

FOREIGN PATENT DOCUMENTS

CN   102594615 B   1/2015

OTHER PUBLICATIONS

Mustafiz et al., Explicit modelling of statechart simulation environments, Jul. 2013, 8 pages.*

(Continued)

*Primary Examiner* — Thuy Dao
(74) *Attorney, Agent, or Firm* — Gilbert Harmon, Jr.

(57) ABSTRACT

Embodiments of the present invention provide methods and systems for simulating variable changes during runtime of a process. The method includes recording variable changes and process context, and filtering sensitive content from the variable changes and process context. The recorded variable changes are recorded into a timeline containing the change in values to the variable changes, which is executed in a simulation environment, in order to debug the process.

14 Claims, 11 Drawing Sheets

(56) References Cited

U.S. PATENT DOCUMENTS

| | | | |
|---|---|---|---|
| 2003/0121027 A1* | 6/2003 | Hines | G06F 11/362 717/135 |
| 2006/0190926 A1 | 8/2006 | Bennett et al. | |
| 2009/0100431 A1 | 4/2009 | Doyle et al. | |
| 2012/0204062 A1* | 8/2012 | Erickson | G06F 11/3636 714/35 |
| 2012/0324473 A1* | 12/2012 | McKenney | G06F 9/526 718/107 |
| 2013/0104041 A1* | 4/2013 | Seshagiri | G06F 11/3414 715/704 |
| 2013/0227530 A1 | 8/2013 | Zhang et al. | |

OTHER PUBLICATIONS

Fu et al., Universal simulation engine (USE): a model-independent library for discrete event simulation, Apr. 2015, 9 pages.*

Silverstone, "Service Virtualization: Transforming IT Change Delivery", LeftShift, May 13, 2014, pp. 1-37.

"IBM Business Monitor", printed Nov. 11, 2015, 2 pages, <http://www-03.ibm.com/software/products/en/business-monitor>.

* cited by examiner

PROCESS VARIABLE CHANGES DATA TABLE

| id | Name | Timestamp | Process | Process node | Type | Variable type | Code snippet |
|---|---|---|---|---|---|---|---|
| p1 | Main.A.va | 2015-06-26T09:56:50.150 | Main | A | Write | Global | ..... |
| p2 | Main.B.va | 2015-06-26T09:56:50.149 | Main | B | Read | Global | ..... |
| p3 | Main.D.va | 2015-06-26T09:56:50.365 | Main | D | Read | Global | ..... |
| p4 | Main.C.va | 2015-06-26T09:56:50.511 | Main | C | Read | Global | ..... |
| p5 | Main.D.va | 2015-06-26T09:56:50.637 | Main | D | Write | Global | ..... |
| p6 | Main.E.E2.va | 2015-06-26T09:56:50.725 | E | E2 | Read | Global | ..... |
| p7 | Main.C.va | 2015-06-26T09:56:50.856 | Main | C | Write | Global | ..... |
| p8 | Main.E.E3.va | 2015-06-26T09:56:50.937 | E | E3 | Write | Global | ..... |

FIG. 5B

VARIABLE VALUE DATA TABLE

| id | Value | Start point | End point |
|---|---|---|---|
| 1 | null | start | p1 |
| 2 | 0 | p1 | p5 |
| 3 | 2 | p5 | p7 |
| 4 | 1 | p7 | p8 |
| 5 | 5 | p8 | end |

FIG. 5C

SIMULATING PROCESS VARIABLE CHANGES DURING PROCESS RUNTIME

BACKGROUND OF THE INVENTION

The present invention relates generally to the field of software debugging, and more particularly to simulating process variable changes during process runtime for debugging.

In an electronic workflow management system, a workflow can be defined as a sequence of concatenated steps to carry out predefined tasks or activities. A workflow can depict a sequence of electronic operations. A typical workflow management system has two components: a design component and a runtime component. The design component typically allows a user to define a process using elements, such as nodes. The runtime component is often responsible for processing data according to one or more workflow processes defined by an end user, using the design components. Often, a workflow engine needs to track and monitor the change in data.

It is common for both a customer and a support team to reproduce problems in another environment for debugging, which may be caused by variable changes. Variables may include both global variables and local variables, and variables can be changed by a service, an output of an event, by a script, and/or by an API.

SUMMARY

According to an embodiment of the present invention, a method, computer program product, and computer system for simulating variable changes are provided. The method comprises: during runtime of a process, recording, by one or more processors, a set of variable changes and a process context; filtering, by one or more processors, sensitive content from the set of variable changes and the process context; importing, by one or more processors, the recorded set of variable changes into a simulator; and executing, by one or more processors, the simulator, to simulate a running sequence of the process using the recorded set of variable changes and the process context.

BRIEF DESCRIPTION OF THE DRAWINGS

FIGS. 5B and 5C depict example tables of process variable change data structures and variable value data structures, respectively, of the variable changes in FIG. 5A, in accordance with an embodiment of the present invention;

DETAILED DESCRIPTION

Embodiments of the present invention provide systems and methods for inspecting process variable changes during process runtime in a customer environment, in order to help a user effectively check a process problem (e.g., a bug) by reproducing the process instance containing the problem in a simulation environment.

Figure 1:
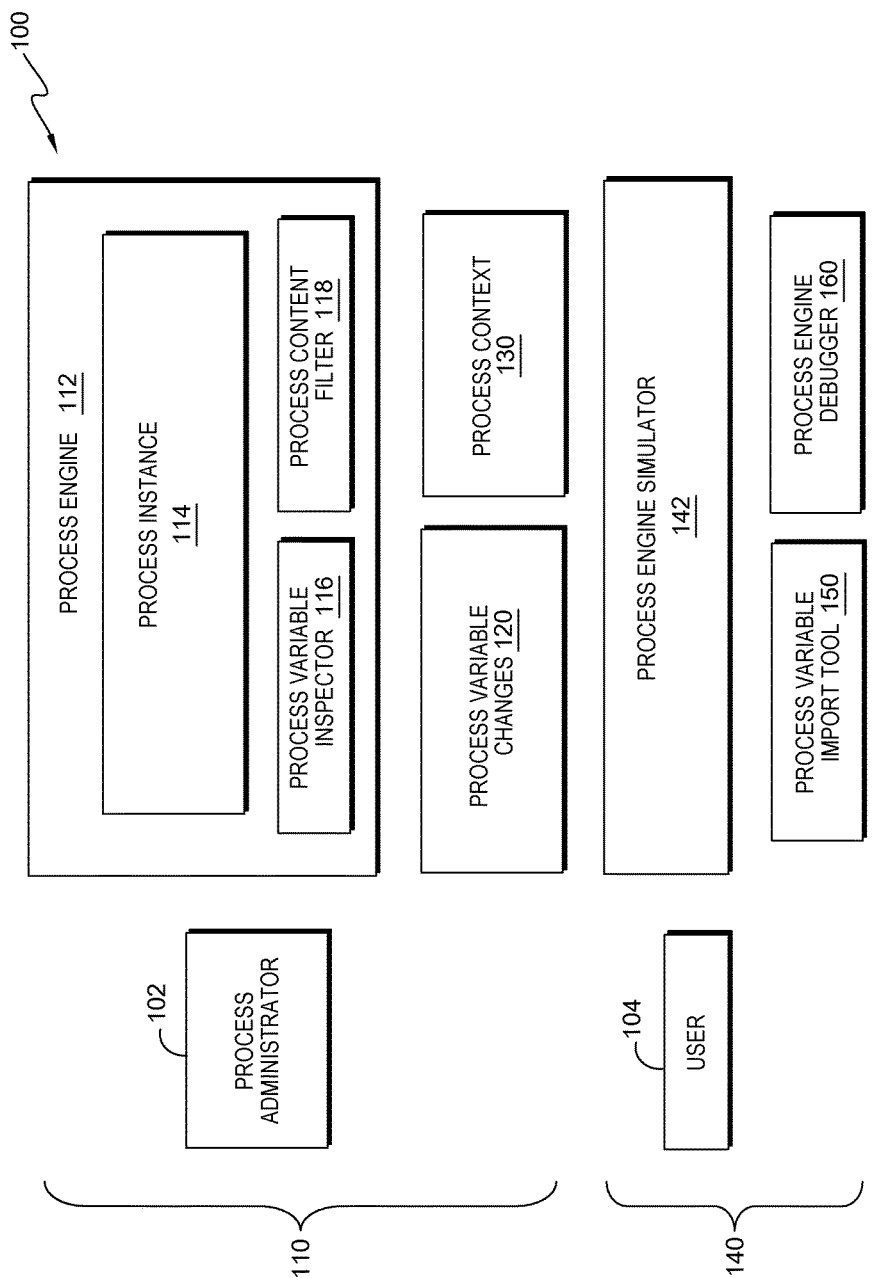
FIG. 1 depicts a block diagram illustrating a processing environment, in accordance with an embodiment of the present invention.

The present invention will now be described in detail with reference to the Figures. FIG. 1 depicts a block diagram illustrating a processing environment, generally designated 100, in accordance with an embodiment of the present invention. Modifications to processing environment 100 may be made by those skilled in the art without departing from the scope of the invention as recited by the claims. In an exemplary embodiment, processing environment 100 includes customer environment 110 and simulation environment 140.

In this exemplary embodiment, customer environment 110 includes process administrator 102, process engine 112, process variable changes 120, and process context 130. Process engine 112 includes process instance 114, process variable inspector 116, and process content filter 118.

Process instance 114 is the current process instance running in process engine 112. Process variable inspector 116 inspects process variable changes during process runtime. Process content filter 118 can be used by process administrator 102 to filter sensitive content from process variable changes 120 and process context 130. Process variable changes 120 record the process variable changes during process runtime, and process context 130 records the input and output of each processing node.

Simulation environment 140 includes user 104, process engine simulator 142, process variable import tool 150, and process engine debugger 160. In this exemplary embodiment, user 104 can be a process developer, process engine tester, process engine developer, or any other type of user which can import process variable changes 120 into process engine simulator 142, in order to reproduce a problem (e.g., a bug). User 104 can use process variable import tool 150 to import process variable changes 120 into process engine simulator 142, which then simulates the imported process instance. Process engine debugger 160 can communicate with process engine simulator 142 to debug the imported process instance in a step-by-step manner.

Figure 2A:
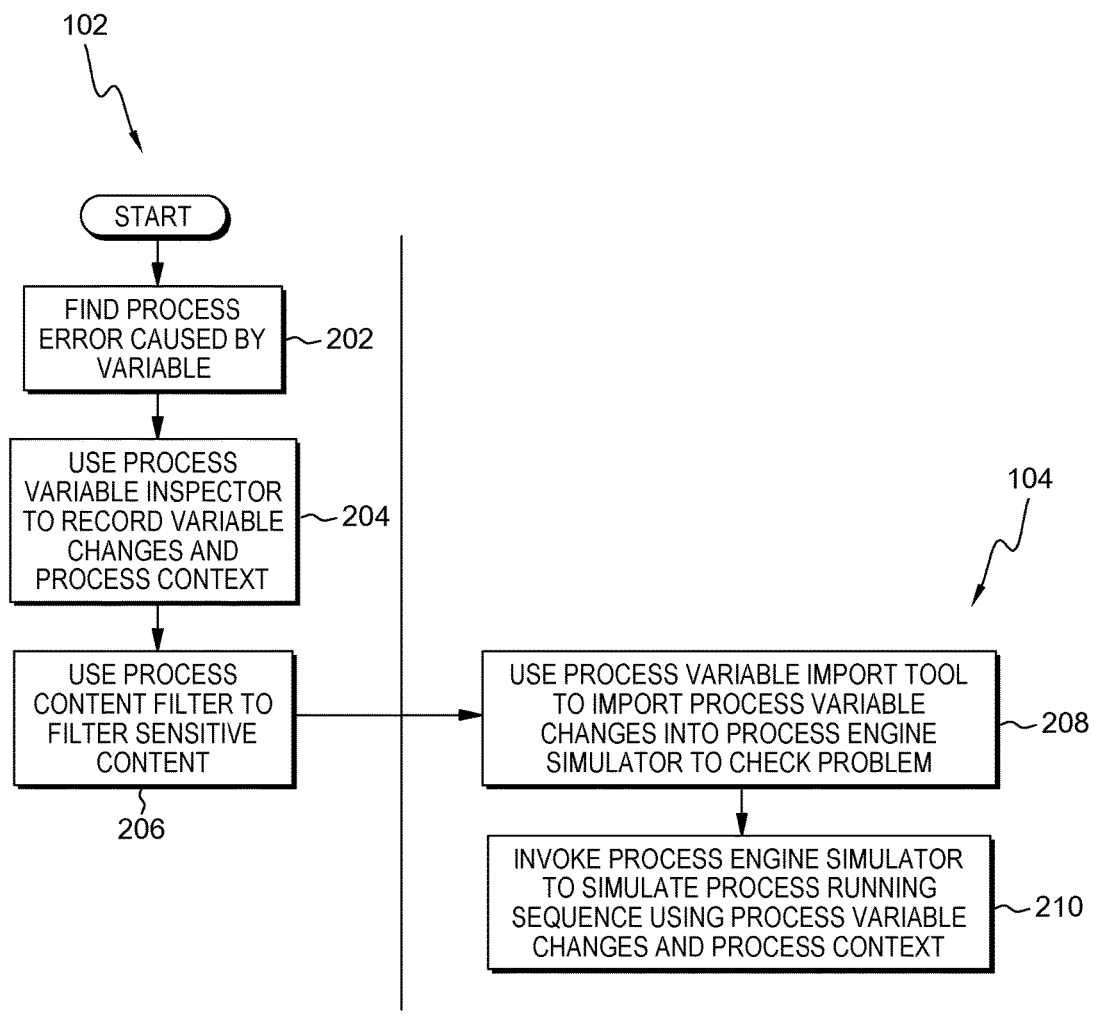
FIG. 2A depicts a flowchart illustrating operational steps for inspecting and recording process variable changes during process runtime, in accordance with an embodiment of the present invention.

FIG. 2A depicts a flowchart illustrating operational steps for inspecting and recording process variable changes 120 during process runtime, in accordance with an embodiment of the present invention.

In step 202, process administrator 102 finds a process error which is caused by a variable. In this exemplary embodiment, after analyzing the process error according to business logic, process administrator 102 may determine that the error is caused by the wrong variable value. In some embodiments, the analysis of the process error is performed by a human. An example of a process error caused by a variable is further depicted in FIG. 3.

In step 204, process administrator 102 uses process variable inspector 116 to record process variable changes 120 and process context 130. In an embodiment, process administrator 102 invokes the operational steps of FIG. 2B for using process variable inspector 116 to record variable changes 120 and process context 130 (described in further detail below).

In step 206, process administrator 102 uses process content filter 118 to filter sensitive content. For example, personal information or other sensitive content may be filtered from process variables by process content filter 118. This is further depicted with respect to FIG. 6.

In step 208, user 104 uses process variable import tool 150 to import process variable changes 120 into process engine simulator 142, in order to check a problem.

In step 210, user 104 invokes process engine simulator 142 to simulate the process running sequence using process variable changes 120 and process context 130. In an embodiment, user 104 invokes the process running sequence of FIG. 2C (discussed below) to simulate the process running sequence using process variable changes 120 and process context 130.

Figure 2B:
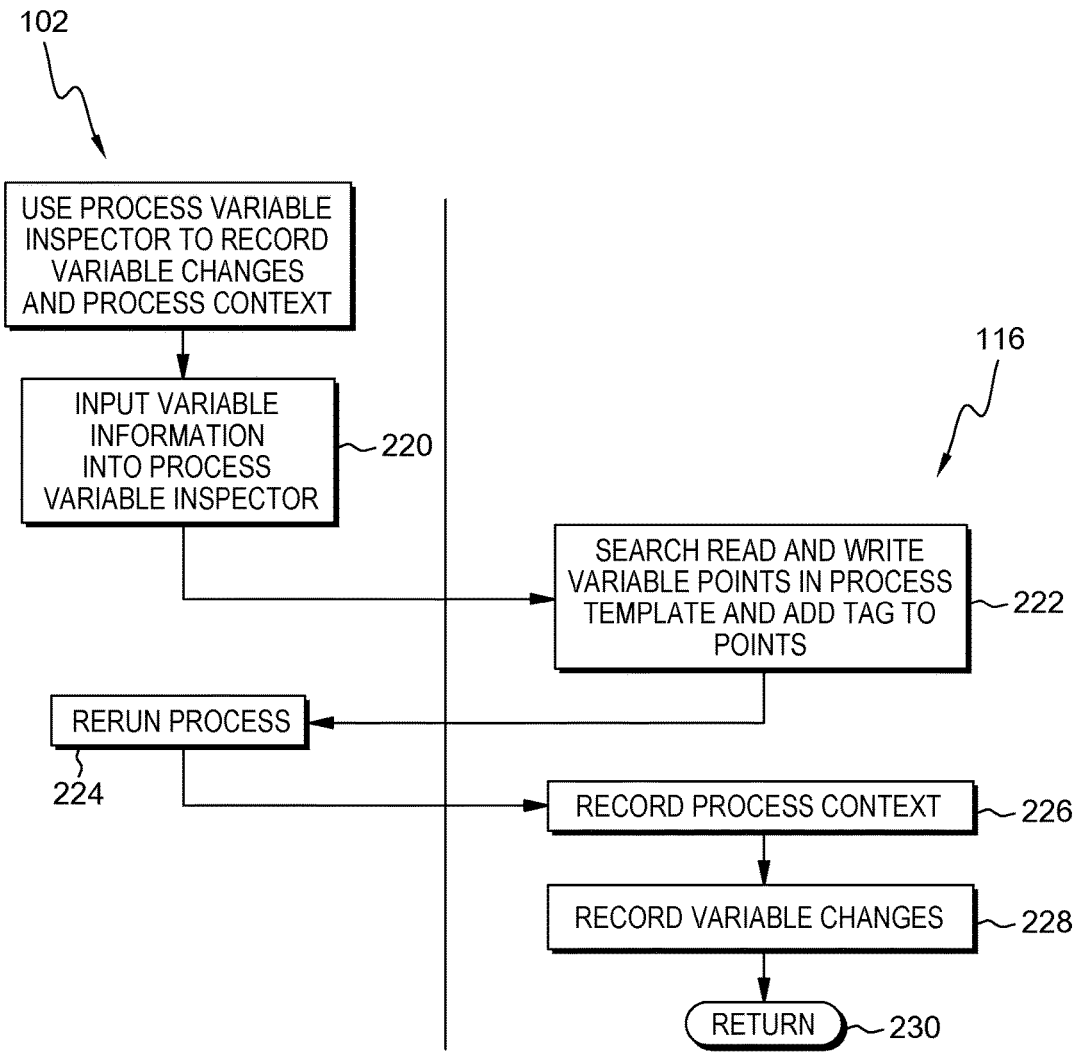
FIG. 2B depicts a flowchart illustrating operational steps for using a process variable inspector to record process variable changes and to process context, in accordance with an embodiment of the present invention.

FIG. 2B depicts a flowchart illustrating operational steps for using a process variable inspector 116 to record process variable changes 120 and to process context 130, in accordance with an embodiment of the present invention.

In step 220, process administrator 102 inputs variable information into process variable inspector 116. The variable information may include the variable name and the variable type (e.g., global or local).

In step 222, process variable inspector 116 searches the read and write variable points in the process template, and adds tags to the searched read and write variable points.

In step 224, process administrator 102 reruns the process. In this exemplary embodiment, the process is rerun in order to record variable changes (i.e., each tagged read and write variable point) and to process context.

In step 226, process variable inspector 116 records process context 130 after the process is rerun.

In step 228, process variable inspector 116 records variable changes 120 after the process is rerun.

In step 230, the subroutine returns to step 206 of FIG. 2A.

Figure 2C:
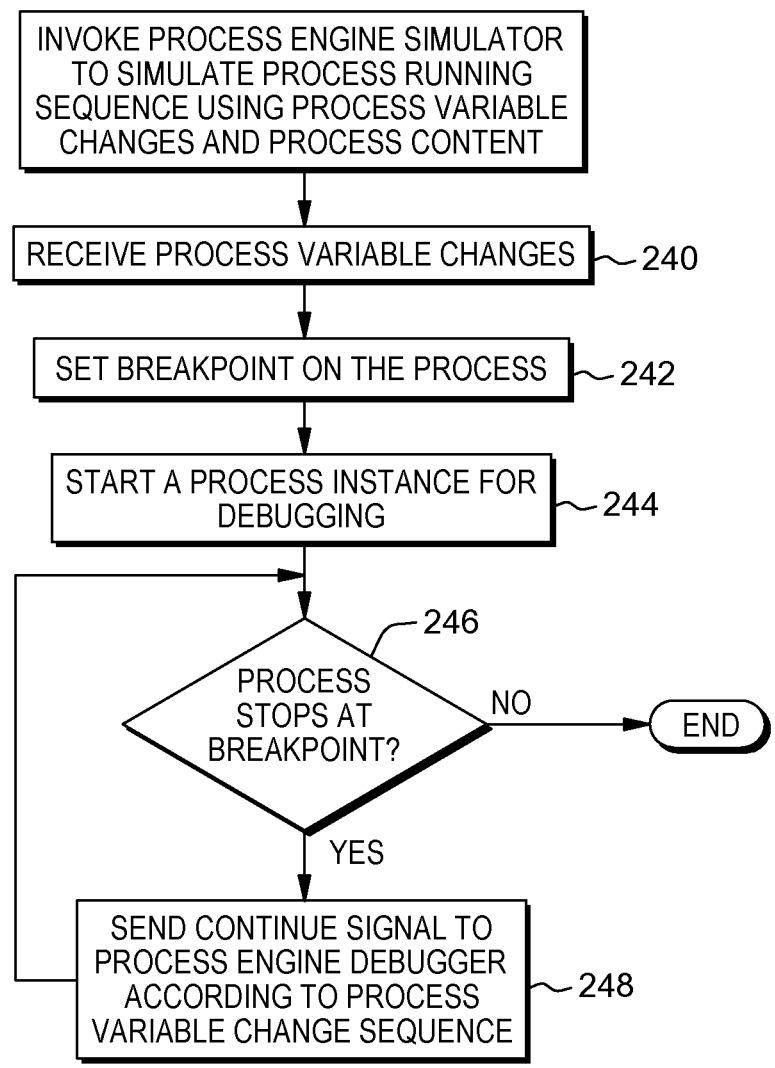
FIG. 2C depicts a flowchart illustrating operational steps for invoking a process engine simulator to simulate a process running sequence, in accordance with an embodiment of the present invention.

FIG. 2C depicts a flowchart illustrating operational steps for invoking a process engine simulator 142 to simulate a process running sequence, in accordance with an embodiment of the present invention.

In step 240, process engine simulator 142 receives process variable changes 120 from user 104.

In step 242, process engine simulator 142 sets breakpoints on the process. In this exemplary embodiment, the breakpoints are set according to the received variable changes at each tagged read and write variable point.

In step 244, process engine simulator 142 starts a process instance for debugging. In some embodiments, variable changes and process context can be inspected in the customer environment 110, which can be used for static analysis, without simulating in process engine debugger 160.

In step 246, process engine simulator 142 determines whether a process instance stops at the breakpoint.

If, in step 246, process engine simulator 142 determines that the process instance stops at the breakpoint, then, in step 248, process engine simulator 142 sends a continue signal to process engine debugger 160, according to the process variable change sequence.

If, in step 246, process engine simulator 142 determines that the process instance does not stop at the breakpoint, then the operational steps end.

Figure 3:
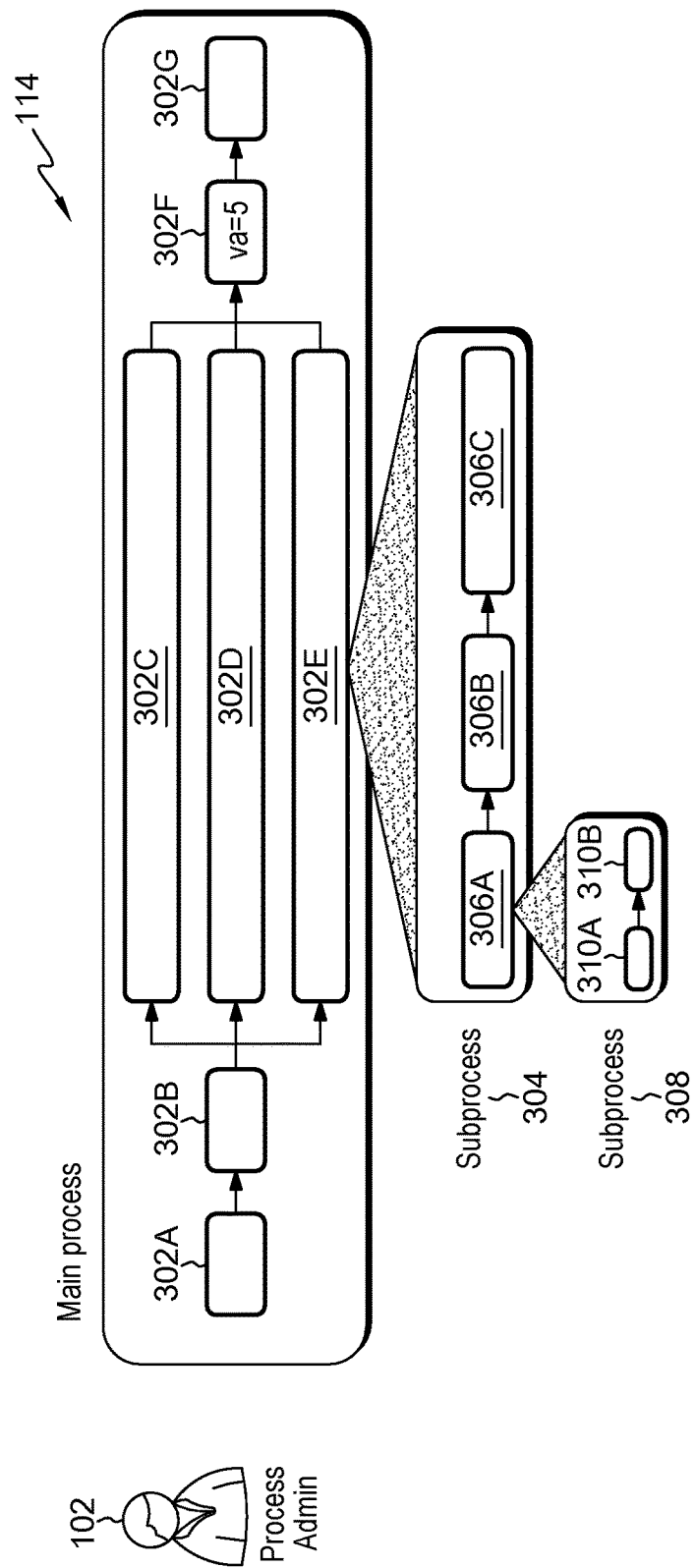
FIG. 3 depicts an example customer environment of a process error caused by variables, in accordance with an embodiment of the present invention.

FIG. 3 depicts an example customer environment of a process error caused by variables, in accordance with an embodiment of the present invention.

As depicted in FIG. 3, the customer environment includes a process instance 114, which includes nodes 302A-G. Node 302E includes subprocess 304, with nodes 306A-C, and node 306A includes subprocess 308 with nodes 310A-B. In this example, the process fails at node 304F, which may be caused by an error in the read and write variable sequence of nodes 302C-E (i.e., the three previous process nodes to node 302F).

Figure 4:
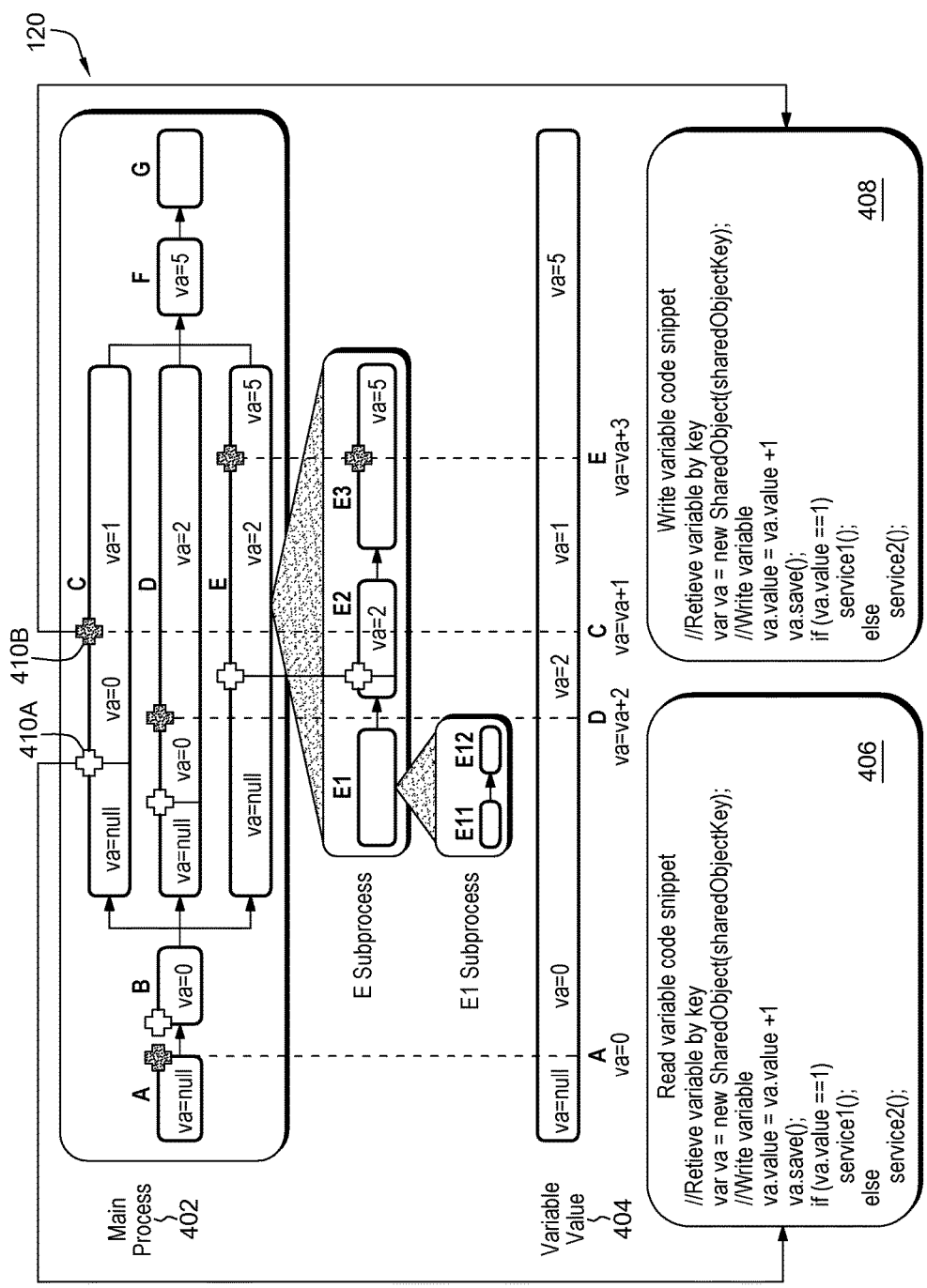
FIG. 4 depicts an example environment in which a process variable inspector maps variable points to code snippets, in accordance with an embodiment of the present invention.

FIG. 4 depicts an example environment in which a process variable inspector 116 maps variable points to code snippets, in accordance with an embodiment of the present invention.

As depicted in FIG. 4, process variable inspector 116 maps the read and write variable points to code snippets, after recording the variable changes (i.e., each tagged read and write variable point, where the tagged read variables are marked with white plus signs and the tagged write variables are marked with shaded plus signs). Process variable changes 120 include main process 402 and variable value 404. At an example tagged read point 410A, process variable inspector 116 records the read variable code snippet 406, which reads in a variable and the corresponding variable value, and at an example tagged write point 410B, process variable inspector 116 records the write variable code snippet 408, which writes a value for the variable change and the corresponding variable value.

Figure 5A:
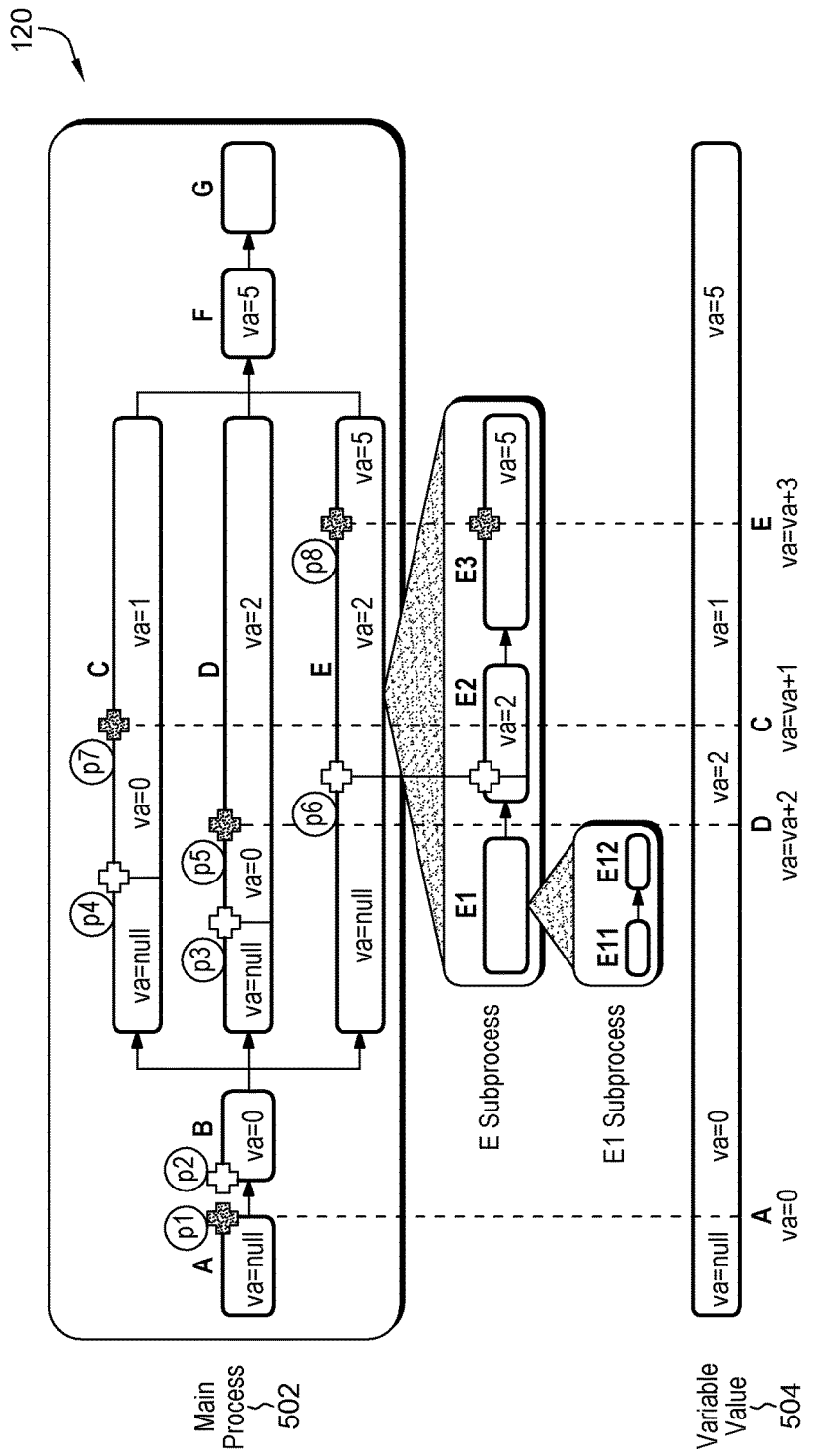
FIG. 5A depicts an example environment in which a process variable inspector records variable points by a timeline, in accordance with an embodiment of the present invention.

FIG. 5A depicts an example environment in which a process variable inspector 116 records variable points by a timeline, in accordance with an embodiment of the present invention.

The process may read or update a variable at any point, and each change in variable value for the variables is recorded when the process executes. The variable changes trigger a recorder to record the timeline of variables changing, and all recorded variable changes are then constructed into the timeline for each of the variables, e.g., when and which code snippet changes the variable, the value of the variables, etc. The recorded timeline can be used for static analysis, and playback at a later point in time, in the simulation environment 140.

In this exemplary embodiment, all process variable changes 120 recorded to code snippets (i.e., read variable code snippet 406 and write variable code snippet 408 of FIG. 4) are constructed as a timeline for the variables, for example, at which point in time and which code changed the variable, the variable values, etc. For example, each variable change is marked with an identification, p1-p8, which denotes the point in time the process variable change is recorded (e.g., identification p1 recorded first, then identification p2, etc.). The recorded timeline can be used for static analysis and playback in process engine debugger 160 at a later time. As depicted in FIG. 5A, read and write variable changes, including the main process 502 and variable value 504, are recorded for the main process 502, and its subprocesses.

FIGS. 5B and 5C depict example tables of process variable change data structures and variable value data structures, respectively, of the variable changes in FIG. 5A, in accordance with an embodiment of the present invention.

As depicted in FIGS. 5B and 5C, process variable changes and variable values are recorded in a table format, to accompany the recorded read and write variables points of FIG. 5A. In FIG. 5B, each process variable change identification (i.e., p1-p8) is recorded, along with relevant data associated with the process variable change. For example, the identification p1 is associated with a name 532 (e.g., Main.A.va), a timestamp 534 (e.g., 2015-06-26T09:56:50.150), a process 536 (e.g., Main), a process node 538 (e.g., A), a type 540 (e.g., Write), a variable type 542 (e.g., Global), and a code snippet 544.

FIG. 5C displays the recorded variable values in a table format. For example, between the start point 554 and end point 556 of identification p1 in FIG. 5A, the variable value 552 (variable value 504 in FIG. 5A) is null, and between the start point 554 of identification p1 and end point 556 of identification p5 of FIG. 5A, the variable value 552 (variable value 504 in FIG. 5A) is 0.

Figure 6:
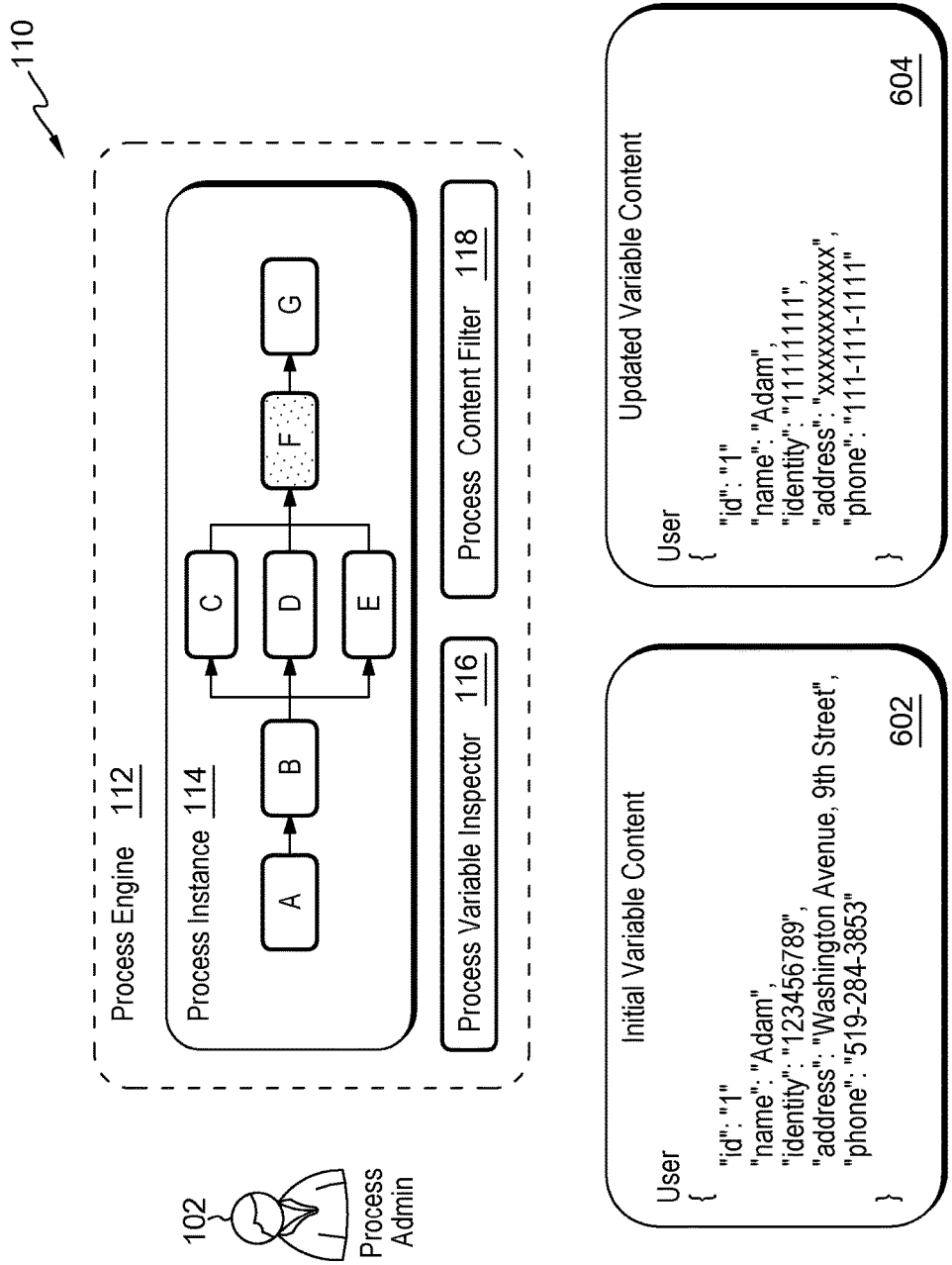
FIG. 6 depicts an example environment in which sensitive content is filtered, in accordance with an embodiment of the present invention.

FIG. 6 depicts an example environment in which sensitive content is filtered, in accordance with an embodiment of the present invention.

As depicted in the example of FIG. 6, process content filter 118 takes the initial variable content 602 and filters the sensitive content from process variable changes 120 and process context 130. For example, sensitive information could include the address, phone number, and personal identification number of a user. Process content filter 118 can identify this personal information, and filter out the personal information to updated variable content 604, so as not to show up in later processing stages.

Figure 7:
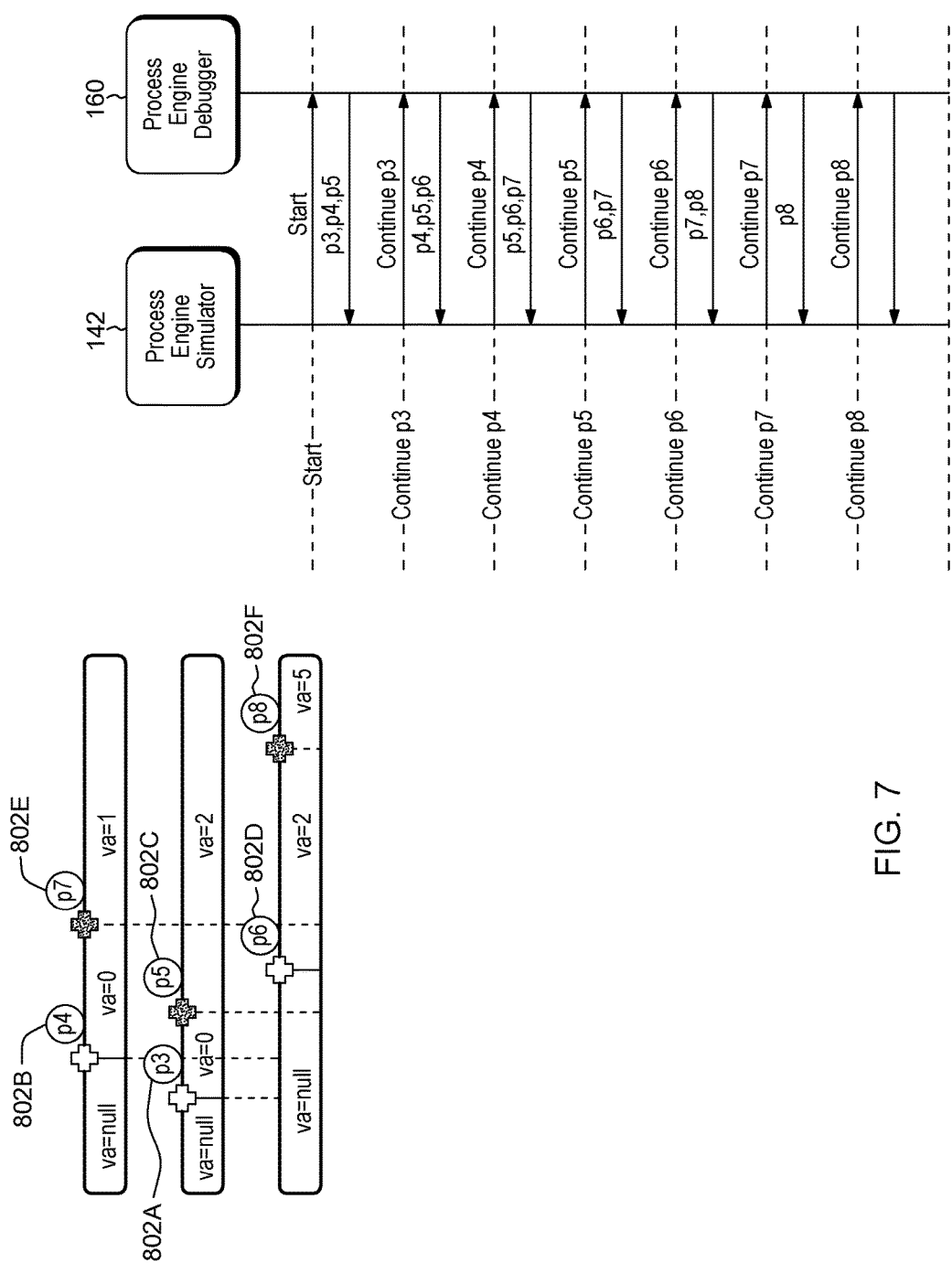
FIG. 7 depicts an example simulation process running sequence for parallel processing nodes, in accordance with an embodiment of the present invention.

FIG. 7 depicts an example simulation process running sequence for parallel processing nodes, in accordance with an embodiment of the present invention.

Process engine simulator 142 communicates with process engine debugger 160, using the set breakpoints, based on the process variable changes to simulate the same process variable change sequence as the runtime process. Process engine simulator 142 controls process engine debugger 160 by instructing process engine debugger 160 where to set the breakpoints, what context and variable values to set, and which breakpoints in parallel paths should be executed first. For example, as depicted in FIG. 7, there are several breakpoints 802A-F (p3-p8, respectively), which are set based on process variable changes. When process engine simulator 142 starts to simulate the process (i.e., step 210 of FIG. 2A), it sends a "start" command to process engine debugger 160 (i.e., step 244 of FIG. 2C). Process engine debugger 160 then stops at breakpoints 802A (p3), 802B (p4), and 802C (p5), and returns the values recorded at the breakpoints to process engine simulator 142. Process engine simulator 142 chooses the headmost breakpoint (802A in this example) in the breakpoints that process engine debugger 160 returned, and sends a "continue breakpoint 802A (p3)" command to process engine debugger 160, to continue to simulate the process (i.e., step 248 of FIG. 2C). Process engine simulator 142 and process engine debugger 160 continue to communicate with each other in this manner, until the last breakpoints are hit (p8 in this example), and then ends the communication.

Figure 8:
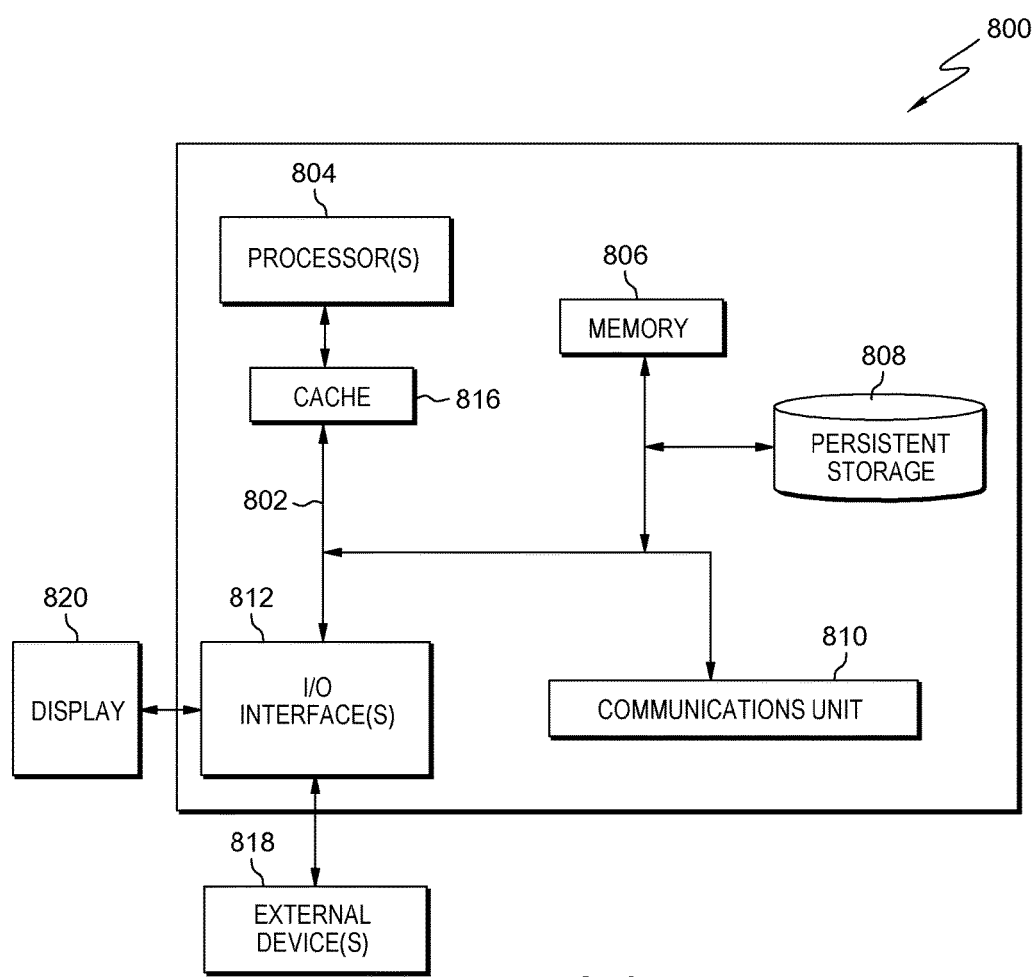
FIG. 8 depicts a block diagram of components of a computing device, in accordance with an illustrative embodiment of the present invention.

FIG. 8 depicts a block diagram of internal and external components of a computing device, generally designated 800, which is representative of components of FIG. 1, in accordance with an embodiment of the present invention. It should be appreciated that FIG. 8 provides only an illustration of one implementation and does not imply any limitations with regard to the environments in which different embodiments may be implemented. Many modifications to the depicted environment may be made.

Computing device 800 includes communications fabric 802, which provides communications between computer processor(s) 804, memory 806, cache 816, persistent storage 808, communications unit 810, and input/output (I/O) interface(s) 812. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses.

Memory 806 and persistent storage 808 are computer-readable storage media. In this embodiment, memory 806 includes random access memory (RAM). In general, memory 806 can include any suitable volatile or non-volatile computer readable storage media. Cache 816 is a fast memory that enhances the performance of processors 804 by holding recently accessed data, and data near recently accessed data, from memory 806.

Program instructions and data used to practice embodiments of the present invention may be stored in persistent storage 808 and in memory 806 for execution by one or more of the respective processors 804 via cache 816. In an embodiment, persistent storage 808 includes a magnetic hard disk drive. Alternatively, or in addition to a magnetic hard disk drive, persistent storage 808 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of persistent storage 808.

Communications unit 810, in these examples, provides for communications with other data processing systems or devices, including resources of a network. In these examples, communications unit 810 includes one or more network interface cards. Communications unit 810 may provide communications through the use of either or both physical and wireless communications links. Program instructions and data used to practice embodiments of the present invention may be downloaded to persistent storage 808 through communications unit 810.

I/O interface(s) 812 allows for input and output of data with other devices that may be connected to computing device 800. For example, I/O interface 812 may provide a connection to external devices 818 such as a keyboard, keypad, a touch screen, and/or some other suitable input device. External devices 818 can also include portable computer-readable storage media such as, for example, thumb drives, portable optical or magnetic disks, and memory cards. Software and data used to practice embodiments of the present invention (e.g., software and data) can be stored on such portable computer-readable storage media and can be loaded onto persistent storage 808 via I/O interface(s) 812. I/O interface(s) 812 also connect to a display 820.

Display 820 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for simulating variable changes, the method comprising:
    during runtime of a process, recording, by one or more processors, a set of variable changes and a process context by:
        receiving, by one or more processors, variable information comprising a variable name and a variable type;
        searching, by one or more processors, a set of read and write variable points in a process template; and
        tagging, by one or more processors, the set of read and write variable points in the process template;
    filtering, by one or more processors, sensitive content from the set of variable changes and the process context;
    importing, by one or more processors, the recorded set of variable changes into a simulator; and
    executing, by one or more processors, the simulator, to simulate a running sequence of the process using the recorded set of variable changes and the process context by:
        receiving, by one or more processors, the set of variable changes;
        setting, by one or more processors, a plurality of breakpoints on the process, based on the set of variable changes at the tagged set of read and write variable points;
    initiating, by one or more processors, a simulated instance of the process, for debugging, wherein the simulated instance of the process comprises a similar set of variable change sequences as the running sequence of the process;
    determining, by one or more processors, whether the simulated instance of the process for debugging stops at one of the plurality of breakpoints; and
    in response to determining the simulated instance of the process for debugging stops at one of the plurality of breakpoints, sending, by one or more processors, a continue signal to a debugger, wherein the continue signal is based on the set of variable changes in the running sequence of the process.

2. The method of claim 1, wherein a variable inspector module maps the set of read and write variable points to a code snippet.

3. The method of claim 1, further comprising:
    executing, by one or more processors, the process, wherein executing the process triggers a recording of a change in value to the set of variable changes to a timeline, wherein the timeline comprises an ordered set of information associated with the change in value to the set of variable changes.

4. The method of claim 3, wherein the recorded timeline is executed, in a simulation environment, during execution of the simulator.

5. The method of claim 1, wherein the simulation of a running sequence of the process using the recorded set of variable changes and the process context executes on a parallel processing node.

6. A computer program product for simulating variable changes, the computer program product comprising:
    a computer readable storage medium and program instructions stored on the computer readable storage medium, the program instructions comprising:
    program instructions to, during runtime of a process, record a set of variable changes to a process context by:
        receiving variable information comprising a variable name and a variable type;
        searching a set of read and write variable points in a process template; and
        tagging the set of read and write variable points in the process template;
    program instructions to filter sensitive content from the set of variable changes and the process context;
    program instructions to import the recorded set of variable changes into a simulator; and
    program instructions to execute the simulator, to simulate a running sequence of the process using the recorded set of variable changes and the process context by:
        receiving, by one or more processors, the set of variable changes;
        setting, by one or more processors, a plurality of breakpoints on the process, based on the set of variable changes at the tagged set of read and write variable points;
    initiating, by one or more processors, a simulated instance of the process, for debugging, wherein the simulated instance of the process comprises a similar set of variable change sequences as the running sequence of the process;
    determining, by one or more processors, whether the simulated instance of the process for debugging stops at one of the plurality of breakpoints; and
    in response to determining the simulated instance of the process for debugging stops at one of the plurality of breakpoints, sending, by one or more processors, a continue signal to a debugger, wherein the continue signal is based on the set of variable changes in the running sequence of the process.

7. The computer program product of claim 6, wherein a variable inspector module maps the set of read and write variable points to a code snippet.

8. The computer program product of claim 6, further comprising:
    program instructions to execute the process, wherein the program instructions to execute the process triggers a recording of a change in value to the set of variable changes to a timeline, and wherein the timeline comprises an ordered set of information associated with the change in value to the set of variable changes.

9. The computer program product of claim 8, wherein the recorded timeline is executed, in a simulation environment, during execution of the simulator.

10. The computer program product of claim 6, wherein the simulation of a running sequence of the process using the recorded set of variable changes and the process context executes on a parallel processing node.

11. A computer system for simulating variable changes, the computer system comprising:
    one or more computer processors;
    one or more computer readable storage media; and program instructions stored on the one or more computer readable storage media for execution by at least one of the one or more processors, the program instructions comprising:
program instructions to, during runtime of a process, record a set of variable changes to a process context by:
　receiving variable information comprising a variable name and a variable type;
　searching a set of read and write variable points in a process template; and
　tagging the set of read and write variable points in the process template;
program instructions to filter sensitive content from the set of variable changes and the process context;
program instructions to import the recorded set of variable changes into a simulator; and
program instructions to execute the simulator, to simulate a running sequence of the process using the recorded set of variable changes and the process context by:
　receiving, by one or more processors, the set of variable changes;
　setting, by one or more processors, a plurality of breakpoints on the process, based on the set of variable changes at the tagged set of read and write variable points;
initiating, by one or more processors, a simulated instance of the process, for debugging, wherein the simulated instance of the process comprises a similar set of variable change sequences as the running sequence of the process;
　determining, by one or more processors, whether the simulated instance of the process for debugging stops at one of the plurality of breakpoints; and
　in response to determining the simulated instance of the process for debugging stops at one of the plurality of breakpoints, sending, by one or more processors, a continue signal to a debugger, wherein the continue signal is based on the set of variable changes in the running sequence of the process.

12. The computer system of claim 11, wherein a variable inspector module maps the set of read and write variable points to a code snippet.

13. The computer system of claim 11, further comprising:
program instructions to execute the process, wherein the program instructions to execute the process triggers a recording of a change in value to the set of variable changes to a timeline, and wherein the timeline comprises an ordered set of information associated with the change in value to the set of variable changes.

14. The computer system of claim 13, wherein the recorded timeline is executed, in a simulation environment, during execution of the simulator.

* * * * *